(12) United States Patent
Gurumoorthy et al.

(10) Patent No.: US 7,225,245 B2
(45) Date of Patent: May 29, 2007

(54) REMOTE DIAGNOSTICS SYSTEM

(75) Inventors: Nagasubramanian Gurumoorthy, Hillsboro, OR (US); Raul Yanez, Phoenix, AZ (US); Mark J. Sullivan, Tempe, AZ (US); Javier A. Galindo, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 647 days.

(21) Appl. No.: 09/927,224

(22) Filed: Aug. 9, 2001

(65) Prior Publication Data

US 2003/0033397 A1    Feb. 13, 2003

(51) Int. Cl.
*G06F 15/173* (2006.01)
*G06F 15/16* (2006.01)
*G06F 15/177* (2006.01)
*G06F 11/00* (2006.01)

(52) U.S. Cl. .................. 709/223; 709/202; 709/220; 709/224; 714/25; 714/27; 713/2

(58) Field of Classification Search ............. 714/27, 714/25; 709/224, 223; 707/202; 713/202, 713/2

See application file for complete search history.

(56) References Cited

U.S. PATENT DOCUMENTS

| | | | |
|---|---|---|---|
| 6,145,096 A * | 11/2000 | Bereiter et al. | 714/25 |
| 6,460,070 B1 * | 10/2002 | Turek et al. | 709/202 |
| 6,594,765 B2 * | 7/2003 | Sherman et al. | 713/202 |
| 6,697,962 B1 * | 2/2004 | McCrory et al. | 714/27 |
| 6,868,507 B1 | 3/2005 | Gurumoorthy et al. | |
| 2002/0133575 A1 * | 9/2002 | Cidon et al. | 709/220 |
| 2002/0165952 A1 * | 11/2002 | Sewell et al. | 709/224 |

OTHER PUBLICATIONS

Extensible Firmware Interface Specification, Version 1.02, sections 1,2 and 17, Dec. 12, 2000.

* cited by examiner

*Primary Examiner*—Bunjob Jaroenchonwanit
*Assistant Examiner*—Philip Lee
(74) *Attorney, Agent, or Firm*—Blakely, Sokoloff, Taylor & Zafman LLP (57) ABSTRACT

Disclosed are a system and method of remotely providing diagnostic procedures to a processing system. Upon being launched on a processing system, an agent process may receive data to provide one or more diagnostic procedures from a data network coupled to the processing system. One or more of the diagnostic procedures may then be executed to provide diagnostic results.

18 Claims, 3 Drawing Sheets

REMOTE DIAGNOSTICS SYSTEM

BACKGROUND

1. Field

The embodiments disclosed herein relate to processing systems. In particular, embodiments disclosed herein relate to processing systems coupled to data networks.

2. Information

Processing systems typically comprise one or more subsystems such as, for example, a central processing unit (CPU), memory (e.g., random access memory (RAM)), main board components (e.g., memory controller, I/O controllers, data bus circuitry, basic input/output system (BIOS) and other logic components which are complementary to a CPU or memory)) and software systems which may be hosted on the processing system. A processing system may also host and execute one or more diagnostic procedures to determine a state or condition of one or more of the subsystems of the processing system or other entities coupled to the processing system. Diagnostic results from such diagnostic procedures may then be used for trouble shooting or quality control purposes.

Diagnostic procedures are typically loaded to a processing system from a memory coupled to the processing system. For example, diagnostic procedures may be loaded from a hard drive or CD-ROM drive coupled to the processing system. If there are any changes to the processing system (e.g., changes to a hardware configuration) affected diagnostic procedures may be updated or modified. Such modification or updating of the diagnostic procedures may entail updating or modifying diagnostic procedures stored in the memory coupled to the processing system.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations one or more data objects. However, this is merely an example of machine-readable instructions and embodiments of the present invention are not limited in this respect.

"Storage medium" as referred to herein relates to media capable of maintaining expressions which are perceivable by one or more machines. For example, a storage medium may comprise one or more storage devices for storing machine-readable instructions. Such a storage device may comprise any type of media suitable for storing data such as, for example, semiconductor, magnetic or optical storage media. However, these are merely examples of a storage medium and embodiments of the present invention are not limited in these respects.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise processing circuitry in combination with machine-executable instructions stored in a memory. However, these are merely examples of structures which may provide logic and embodiments of the present invention are not limited in this respect.

A "processing system" as discussed herein relates to a combination of hardware and software resources for accomplishing computational tasks. However, this is merely an example of a processing system and embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a host processing system and peripheral device and embodiments of the present invention are not limited in these respects.

A "data bus" as referred to herein relates to circuitry for transmitting data between devices. For example, a data bus may transmit data between a host processing system and a peripheral device. However, this is merely an example of a data bus and embodiments of the present invention are not limited in this respect. A "bus transaction" as referred to herein relates to an interaction between devices coupled in a bus structure wherein one device transmits data addressed to the other device through the bus structure.

An "operating system" as referred to herein relates to one or more encoded procedures for facilitating communication between application procedures and processing resources of a processing system. Such an operating system may allocate processing resources to application procedures and provide an application programming interface (API) comprising callable software procedures for execution on the processing resources in support of application procedures. However, these are merely examples of an operating system and embodiments of the present invention are not limited in these respects. A "basic input/output system" (BIOS) refers to systems for providing machine-readable instructions ("BIOS routines") to a processing system processor for initializing hardware resources of a processing system.

A "firmware interface" refers to software routines and data structures to enable communication between an operating system and hardware resources of a processing system. Such a firmware interface may define an interface between the hardware resources of a processing system and for one or more or more independently developed operating systems. However, this is merely an example of a firmware interface and embodiments of the present invention are not limited in this respect. According to an embodiment, BIOS routines may be executed on hardware resources to install the software routines and data structures of a firmware interface on hardware resources of a processing system and then subsequently install an operating system during a boot sequence or in response to a system reset event. However, this is merely an example of a firmware interface and embodiments of the present invention are not limited in this respect.

A program "launch" as referred to herein relates to an initiation of an execution of the program on a processing system. This may occur, for example, upon an initiation of the execution of instructions for the program at a location in a system memory of the processing system. However, this is merely an example of a program launch and embodiments of the present invention are not limited in this respect.

A "diagnostic procedure" as referred to herein relates to procedures which are executable on a processing system to evaluate a subsystem related to the processing system. Such a subsystem to be evaluated may comprise portions of the processing system executing the procedure. Alternatively, a diagnostic procedure may be directed to evaluating devices or software subsystems coupled to the processing system. However, these are merely examples of a diagnostic procedure and embodiments of the present invention are not limited in this respect.

A "diagnostic result" as referred to herein relates to data which may be provided by a diagnostic procedure in response to execution. Such a diagnostic result may indicate a state or condition of a subsystem that is an object of a corresponding diagnostic procedure. A diagnostic result may be provided in a raw data format or a format for presentation in a document. However, these are merely examples of a diagnostic result and embodiments of the present invention are not limited in this respect.

A "data network" as referred to herein relates to a system to transmit data between or among nodes coupled to a transmission medium. Such data may be transferred between or among nodes according to one or more communication protocols. However, this is merely an example of a data network and embodiments of the present invention are not limited in this respect.

An "agent process" as referred to herein relates to process hosted on a processing system to execute one or more defined tasks. Such tasks may include, for example, gathering information, detection of events or conditions associated with the processing system or execution of procedures in response to detection of an event or condition. An agent process may be hosted on a processing system in association with first a node on a data network such that the agent process may communicate through the data network with a process hosted in association with a second node on the data network. However, these are merely examples of an agent process and embodiments of the present invention are not limited in these respects.

A "diagnostic source" as referred to herein relates to an entity capable of providing data to a processing system to enable execution of one or more diagnostic procedures at a processing system. For example, a diagnostic source may provide text files or other data to provide one or more diagnostic procedures for execution at a target processing system. Such data provided to a target processing system may be used to modify or update one or more diagnostic procedures hosted on the target processing system. Additionally, a diagnostic source may comprise a diagnostic server to provide data through a data network to an agent process hosted on a target processing system. However, these are merely examples of a diagnostic source and embodiments of the present invention are not limited in these respects.

Briefly, an embodiment of the present invention relates to a system and method of remotely providing diagnostic procedures to a processing system. Upon being launched on a processing system, an agent process may receive data to provide one or more diagnostic procedures from a data network coupled to the processing system. One or more of the diagnostic procedures may then be executed to provide diagnostic results. However, this is merely example embodiment and other embodiments are not limited in these respects.

Figure 1:
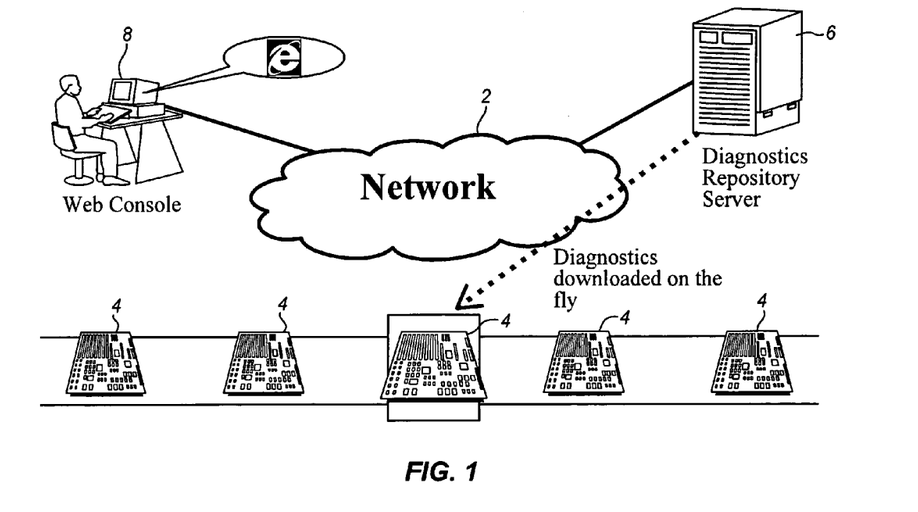
FIG. 1 shows a schematic diagram of a system for providing diagnostic procedures to a processing system based upon data provided by a data network according to an embodiment of the present invention.

FIG. 1 shows a schematic diagram of a system for providing diagnostic procedures to a processing system based upon data provided by a data network according to an embodiment of the present invention. A data network 2 is coupled to a diagnostics server 6, an operator console 8 and a processing system 4. In the illustrated embodiment, processing systems 4 are being tested in an assembly line fashion such that diagnostic procedures are sequentially provided to each processing system 4 and executed one processing system at a time. However, this is merely an example of how a system of remotely performing diagnostic tests and embodiments of the present invention are not limited in this respect.

In the illustrated embodiment, each of the processing systems 4 may host a firmware interface that enables communication with hardware resources and subsystems to be tested. Upon launching an agent process (not shown), a processing system 4 may receive data from the diagnostics server 6 to provide diagnostic procedures through the data network 2 to the processing system 4. Execution of the diagnostic procedures may then provide diagnostic results to be transmitted by the agent processing to the operator console 8 through the network 2. However, this is merely an example of how diagnostic procedures may be remotely provided to a processing system and executed, and embodiments of the present invention are not limited in this respect.

The diagnostics server 6 may provide data to a processing system 4 through the data network 2 in response to requests from the agent process or the operator console 8. The data provided by the diagnostic server 6 may comprise encoded diagnostic procedures (e.g., text files) which are executable at the processing system 4 on a firmware interface. Alternatively, the agent process may natively comprise portions of one or more diagnostic procedures and the diagnostic server 6 may provide updated diagnostic procedures, portions of diagnostic procedures or parameters for diagnostic procedures. However, these are merely examples of remotely providing diagnostic procedures for execution on a processing system and embodiments of the present invention are not limited in this respect.

According to an embodiment, the agent process may initiate execution of one or more diagnostic procedures on a processing system 4 including, for example, testing new features of a central processing unit (CPU), writing test pattern data to locations in a memory to determine that the memory works properly, writing to registers of other logic components which are complementary with the CPU and memory to test features of such logic components. However, these are merely examples of diagnostic procedures which may be executed on a processing system in an assembly line test and embodiments of the present invention are not limited in this respect.

According to an embodiment, the agent process may transmit a message to the diagnostics server 6 through the data network 2 to request the data to provide the diagnostic procedures at the processing system 4. Such a message from the agent process may comprise an identifying code which the diagnostic server 6 may use to select data to be returned to the agent process to provide diagnostic procedures at the processing system 4. Such an identifying code may comprise, for example, information identifying a hardware configuration or version, operating system, or other information indicating the character and nature of the diagnostic procedures to be provided to the agent process. However, these are merely examples of an identifying code that may be used to select data to provide diagnostic procedures and embodiments of the present invention are not limited in this respect.

Figure 2:
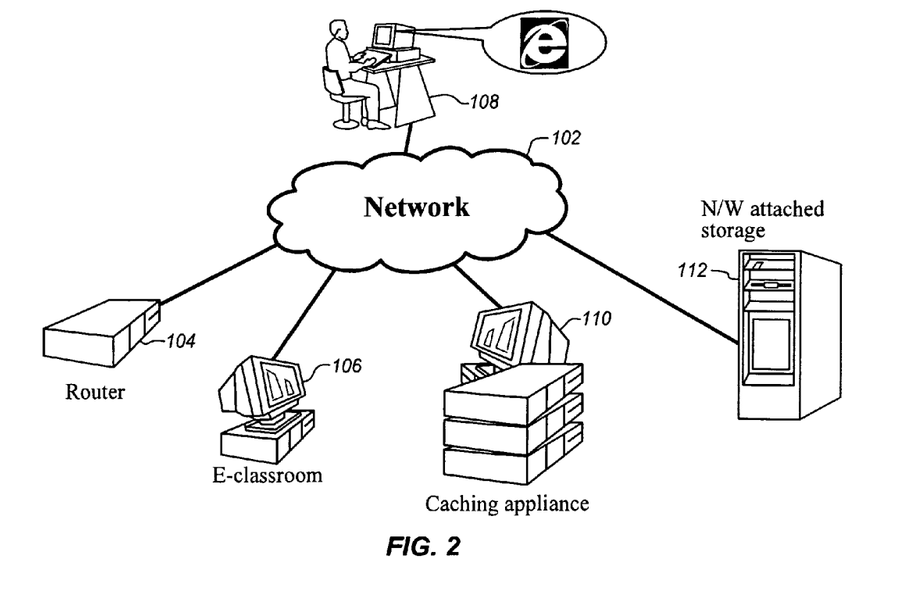
FIG. 2 shows a schematic diagram of a system for providing diagnostic procedures to a processing system based upon data provided by a data network according to an alternative embodiment of the present invention for use in field testing.

FIG. 2 shows a schematic diagram of a system for providing diagnostic procedures to a processing system based upon data provided by a data network according to an alternative embodiment of the present invention for use in field testing. A data network 102 may transmit data between an operator console 108 and a remote device such as a router 104, electronic classroom console 106, caching appliance or network attached storage (NAS) system 112. However, these are merely examples of remote devices which may be tested in the field and embodiments of the present in invention are not limited in this respect. The a router 104, electronic classroom console 106, caching appliance and NAS system 112 may each comprise a processing system (not shown) which is capable of executing diagnostic procedures on a firmware interface. However, this is merely an example of how diagnostic procedures may be provided to remote devices for field testing and embodiments of the present invention are not limited in this respect.

In the illustrated embodiment, a processing system in one of the aforementioned remote devices may perform diagnostic procedures in the filed relating to the condition or status of one or more subsystems of the remote device. Such diagnostics may include, for example, testing hard drive integrity (e.g., if the processing system of the remote device fails to boot an operating system) or testing functions or capabilities of input/output devices such as controllers for Ethernet, asynchronous transfer mode (ATM) and small computer system interface (SCSI) devices. However, these are merely examples of diagnostic procedures which may be executed at remote devices in field testing and embodiments of the present invention are not limited in these respects.

The operator console 108 may provide data to selected ones of the remote devices through the data network 102 to initiate or enable execution of diagnostic procedures by respective processing systems of the remote devices. According to an embodiment, each of the remote devices may comprise a processing system to host an agent process. At runtime, the agent process may transmit a request to the operator console 108 for data to enable execution of one or more diagnostic procedures. Alternatively, the operator console 108 may transmit a message to the remote device to initiate a launch of the agent process. However, these are merely examples of how an agent process hosted on a remote device in the field may communicate with an operator console and embodiments of the present invention are not limited in this respect.

According to an embodiment, the agent process may transmit a message to the operator console 108 comprising an identifying code. Such an identifying code may comprise, for example, information identifying the remote device, a hardware configuration or version, operating system, or other information indicating the character and nature of the diagnostic procedures to be provided to the agent process for evaluating the remote device. A process at the operator console 106 may then use the identifying code to select data to be returned to the agent process to provide diagnostic procedures at the remote device for field testing. However, these are merely examples of an identifying code that may be used to select data to provide diagnostic procedures and embodiments of the present invention are not limited in this respect.

In the embodiments illustrated with reference to FIGS. 1 and 2, the data networks 2 and 102 may comprise any combination of public or private communication networks capable of transmitting data between or among the operator console 8, diagnostics server 6 and processing systems 4, or transmitting data between the operator console 108 and any of the router 104, electronic classroom console 106, caching appliance or NAS system 112. The data network 2 or data network 102 may transmit data according to a data communication protocol such as, for example, Transmission Control Protocol/Internet protocol (TCP/IP), User Datagram Protocol (UDP/IP) or a Point-to-Point protocol (PPP). Also, the data network 2 or data network 102 may comprise any combination of transmission media including, for example, wireless transmission media, twisted wire pair media, or coaxial, optical or category five cabling. However, these are merely examples of a data network and embodiments of the present invention are not limited in these respects.

The operator console 8 (FIG. 1) or operator console 108 (FIG. 2) may host a network browser which is capable of presenting diagnostic results received from a data network following execution of diagnostic procedures. Such a network browser may comprise a commercially available network browser capable of presenting data in a graphical user interface at the operator console 8 such as versions of the Explorer™ browser sold by Microsoft Corporation or Navigator™ sold by Netscape. However, this is merely an example of how an operator console may present diagnostic results received from a data network and embodiments of the present invention are not limited in this respect.

Figure 3:
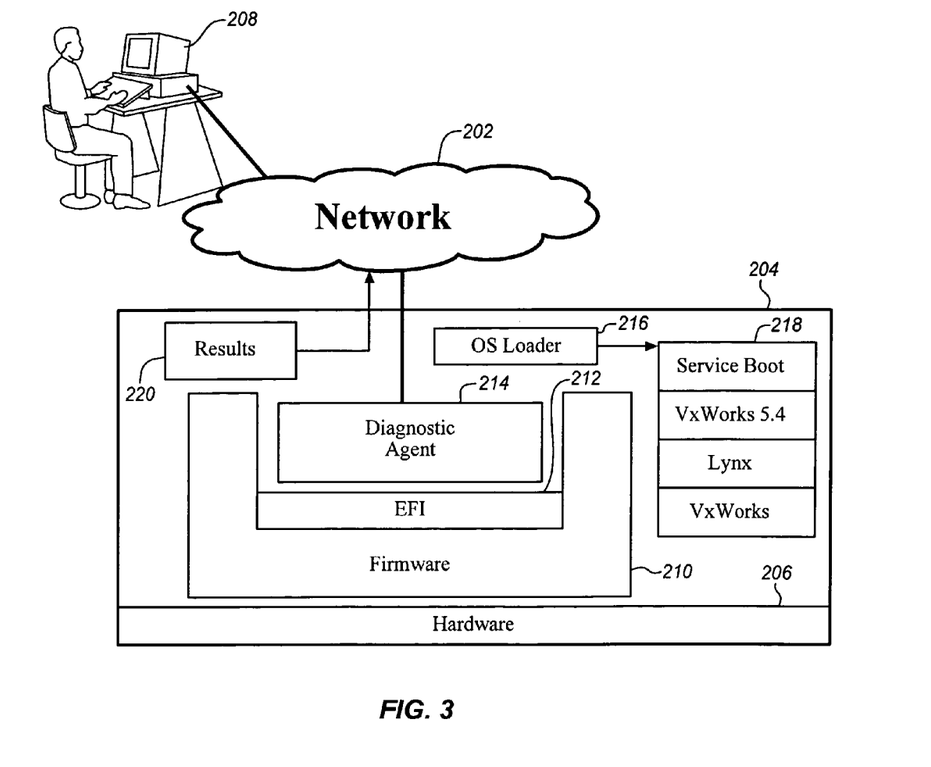
FIG. 3 shows a schematic diagram of a processing system for executing a diagnostic procedure according to an embodiment of the present invention.

FIG. 3 shows a schematic diagram of a processing system for executing a diagnostic procedure according to an embodiment of the present invention as illustrated with reference to the systems shown in FIGS. 1 and 2. A processing system 204 is coupled to an operator console 208 through a data network 202. The processing system 204 comprises hardware 206 which is capable of hosting processes through firmware 210.

The hardware 206 may comprise a central processing unit (CPU), random access memory (RAM) and other hardware devices coupled to a data bus. Additionally, the hardware 206 may comprise a communication device coupled to the network 202 to enable communication between processes hosted on the processing system 204 and other devices coupled to the network 202. Furthermore, the hardware 206 may also comprise other main board components such as, for example, a memory controller, I/O controllers, data bus circuitry, BIOS logic and other logical components which are complementary with a CPU or memory. However, this is merely an example of a hardware portion of a processing system and embodiments of the present invention are not limited in this respect.

The firmware 210 comprises logic which may be maintained on the hardware 206 and originate from machine-readable instructions loaded to a storage medium (e.g., RAM) during a reset procedure. For example, the firmware 210 may comprise portions of routines which are stored in a non-volatile memory associated a BIOS and loaded to a RAM to initialize low-level functions (e.g., data bus enumeration and device initialization) of the processing system 204. However, this is merely an example of firmware which may reside on a processing system and embodiments of the present invention are not limited in this respect.

The firmware 210 may also comprise a firmware interface 212 to enable communication between the hardware 206 and application processes or an operating system. The firmware interface 212 may comprise data structures or routines defined in an extensible firmware interface (EFI) as described in the Extensible Firmware Interface Specification, Version 1.02 Dec. 12, 2000 published by Intel Corporation (hereinafter "EFI Specification"). However, this is merely an example of a firmware interface and embodiments of the present invention are not limited in this respect.

In the illustrated embodiment, diagnostic procedures 214 may be hosted on the firmware 212 to enable diagnostic tests such as, for example, components in a hardware configuration in an assembly line or controllers for I/O devices as discussed above with reference to FIGS. 1 and 2. The diagnostic procedures may be provided by data downloaded from a source (e.g., diagnostics server 6 in FIG. 1 or operator console 108 shown in FIG. 2) through the data network 202. For example, the source may transmit encoded diagnostic procedures (e.g., text files) which are executable on the firmware interface 212. Alternatively, an agent process hosted on the firmware interface 212 (not shown) may natively comprise portions of one or more diagnostic procedures and the source may transmit updated diagnostic procedures, portions of diagnostic procedures or parameters of diagnostic procedures.

According to an embodiment, the firmware interface 212 may comprise logic to provide a boot manager (not shown) to provide an operating system in response to a system reset. A boot manager may be configured to launch an operating system (OS) loader 216 to execute instructions launching an operating system according to a predefined sequence 218 as described in the EFI Specification at Chapter 17. In the illustrated embodiment, however, the boot manager may be configured to launch an agent process 214 in lieu of the OS loader 216 to place the processing system 204 in a diagnostic mode. In other embodiments, routines in conventional firmware or BIOS may be configured to launch an agent process in lieu of an operating system. These are merely examples of logic to launch an agent process to place a processing system in a diagnostic mode and embodiments of the present invention are not limited in these respects.

The launched agent 214 may then request data from a source (e.g., the diagnostic server 6 or operator console 208) to obtain data for diagnostic procedures to be executed on the processing system 204. Upon execution of the diagnostic procedures (e.g., to perform diagnostic tests on subsystems of or relating to the processing system 204), the agent 214 may then transmit one or more diagnostic results to the operator console 208 through the data network 202. However, this is merely an example of how a processing system may execute diagnostic procedures based upon data received from a source over a data network and embodiments of the present invention are not limited in this respect.

Figure 4:
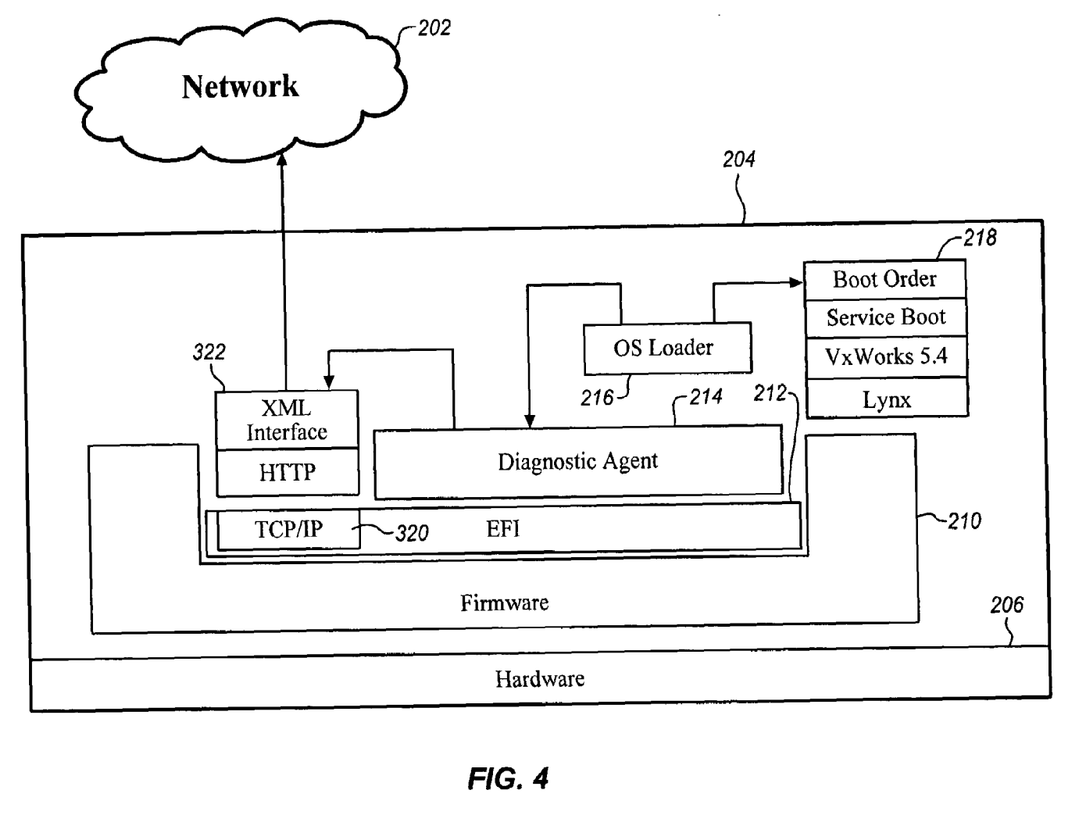
FIG. 4 shows a schematic diagram of a processing system for executing a diagnostic procedure and providing a diagnostic result according to an embodiment of the processing system shown in FIG. 3.

FIG. 4 shows a schematic diagram of a processing system for executing a diagnostic procedure and providing a diagnostic result according to an embodiment of the processing system shown in FIG. 3. The agent process 214 may comprise logic to communicate with processes coupled to the data network 202. In the illustrated embodiment, the agent process 214 may establish communication with processes coupled to the data network 202 according to a communication protocol by initiating a communication interface 322 with the hardware 206 through a network driver 320 in the firmware interface 312. However, this is merely example of how an agent process may be configured to communicate with processes on a data network and embodiments of the present invention are not limited in this respect.

According to an embodiment, the agent process 214 may request data from a remote source coupled to the data network 202 (e.g., the diagnostics server 6 or operator console 208) to provide diagnostic procedures to execute on the processing system 204. This may be implemented using any one of several communication protocols including, for example, a TCP/IP protocol. The remote source may provide the agent process 322 with one or more text files and/or data containing diagnostic procedures to execute on the processing system 204 such as, for example, diagnostic procedures to test elements of the hardware 206 (e.g., a CPU, memory, memory controller, I/O controllers, data bus circuitry, BIOS or other logic components which are complementary to a CPU or memory), software subsystems (e.g., subsystems integrated with the firmware interface 212), or other subsystems coupled to the processing system 204 (e.g., through an external data bus or network). However, these are merely examples of diagnostic procedures which may be received from a remote source at an agent process and embodiments of the present invention are not limited in this respect.

According to an embodiment, the agent process 214 may request data (to provide diagnostic procedures) from the remote source in a message transmitted through the data network 202 comprising an identifying code. The remote source may then use the identifying code to select data to be returned to the agent process 214 to provide diagnostic procedures at the processing system 204. Such an identifying code may comprise, for example, information identifying a hardware configuration or version, operating system, or other information indicating the character and nature of the diagnostic procedures to be provided to the agent process. However, this is merely an example of how an agent process may request data to provide diagnostic procedures and embodiments of the present invention are not limited in this respect.

Upon receipt of data from a remote source to provide diagnostic procedures (requested by the agent process 314), the processing system may execute the diagnostic procedures on the firmware interface 212 and provide results to one or more processes through the communication interface 322. For example, the agent process 214 may automatically initiate execution of the diagnostic procedures upon receipt of the data from the remote source. Alternatively, execution of the diagnostic procedures may be initiated by another event such as, for example, receipt of a message from an external process (e.g., a process hosted at the operator console 208) at the agent process 214 to commence execution of selected ones or all of the diagnostic procedures or in response to an event at the hardware 206 detected at the firmware interface 212. However, this is merely an example of how the execution of diagnostic procedures on a processing system may be initiated and embodiments of the present invention are not limited in this respect.

Upon execution, the diagnostic procedures may provide diagnostic results indicating, for example, conditions or states associated with subsystems of the processing system 204. For example, a diagnostic result may be an indication of an identification of a tested component or subsystem, an indication of a "pass" or "fail" for a tested component or subsystem, or time of failure of a tested component or subsystem. Such diagnostic results may be provided in the form of a return code or alphanumeric string. However, these are merely examples of diagnostic results and embodiments of the present invention are not limited in this respect.

The agent 214 may format the diagnostic results for transmission to an external process coupled to the data network 202 (e.g., the operator console 208). In one embodiment, the agent 214 may automatically transmit the formatted diagnostic results to the external process in response to completion of execution of one or more diagnostic procedures. Alternatively, the agent process 214 may maintain diagnostic results following execution of diagnostic procedures for transmission to the external process in response to an external requests received from the data network 202. However, these are merely examples of how diagnostic results may be provided to an external process and embodiments of the present invention are not limited in these respects.

According to an embodiment, the agent process 214 may launch the communication interface 322 coupled to the network driver 320 to communicate with external processes through the data network 202 according to a communication protocol. In the illustrated embodiment, the agent 322 may launch the communication interface 322 to communicate through the data network 202 according to a Hypertext Transfer Protocol (HTTP) and using an extensible markup language (XML). In this embodiment, the communication interface 322 may provide diagnostic results to an external process which are formatted in XML, enabling flexibility in presentation of the diagnostic results at the external process (e.g., the operator console 208). However, this is merely an example of how an agent process may format diagnostic results for presentation at a remote process and embodiments of the present invention are not limited in this respect.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:
   launching a diagnostic agent process at a host processing system upon boot-up of the host processing system;
   transmitting a hardware version associated with the diagnostic agent process from the diagnostic agent process to a diagnostic server;
   receiving data from the diagnostic server at the host processing system via a data network to provide one or more diagnostic procedures for the diagnostic agent process, wherein the diagnostic server is a centralized repository for the diagnostic procedures, and wherein the one or more diagnostic procedures are selected based on the hardware version;
   upon receipt of the one or more diagnostic procedures, automatically executing the one or more diagnostic procedures on the host processing system using a firmware interface to provide one or more diagnostic results;
   receiving updated diagnostic procedures from the diagnostic server to maintain synchronization of the diagnostic agent process with current diagnostic procedures; and
   transmitting the one or more diagnostic results to the diagnostic server.

2. The method of claim 1, the method further comprising: formatting the diagnostic results for transmission.

3. The method of claim 2, the method further comprising formatting the diagnostic results according to an extensible markup language (XML).

4. The method of claim 1, the method further comprising transmitting a message requesting the one or more diagnostic procedures through the data network in response to launching the diagnostic agent process on the host processing system.

5. The method of claim 1, the method further comprising transmitting a request for the data to provide one or more diagnostic procedures through the data network in response to launching the diagnostic agent process.

6. An article comprising:
   a storage medium comprising machine-readable instructions stored thereon for:
   launching a diagnostic agent process at a host processing system upon boot-up of the host processing system;
   transmitting a hardware version associated with the diagnostic agent process from the diagnostic agent process to a diagnostic server;
   receiving data from the diagnostic server at the host processing system via a data network to provide one or more diagnostic procedures for the diagnostic agent process, wherein the diagnostic server is a centralized repository for the diagnostic procedures, and wherein the one or more diagnostic procedures are selected based on the hardware version;
   upon receipt of the one or more diagnostic procedures, automatically executing the one or more of diagnostic procedures on the host processing system using a firmware interface to provide one or more diagnostic results;
   receiving updated diagnostic procedures from the diagnostic server to maintain synchronization of the diagnostic agent process with current diagnostic procedures; and
   transmitting the one or more diagnostic results to the diagnostic serve.

7. The article of claim 6, wherein the storage medium further comprises machine-readable instructions stored thereon for: formatting the diagnostic results for transmission; and transmitting the formatted diagnostic results through the data network.

8. The article of claim 7, wherein the storage medium further comprises machine-readable instructions stored thereon for formatting the diagnostic results according to an extensible markup language (XML).

9. The article of claim 6, wherein the storage medium further comprises machine-readable instructions stored thereon for transmitting a message requesting the data to provide one or more diagnostic procedures through the data network in response to launching the diagnostic agent process on the host processing system.

10. The article of claim 6, wherein the storage medium further comprises machine-readable instructions stored thereon for launching a second diagnostic agent process to the processing system, the second diagnostic agent process comprising logic to transmit a request for the data to provide one or more diagnostic procedures through the data network and logic to initiate execution of diagnostic procedures.

11. A system comprising:
a wireless network;
a diagnostic server coupled to the wireless network the diagnostic server to update diagnostic procedures, and to transmit updated diagnostic procedures to a diagnostic agent process on a host processing system to maintain synchronization of the diagnostic agent process with current diagnostic procedures, wherein the diagnostic server is a centralized repository for the diagnostic procedures; and
the host processing system including at least one central processing unit to execute logics comprising:
logic to launch the diagnostic agent process on the host processing system upon boot-up of the host processing system;
logic to transmit a hardware version associated with the diagnostic agent process from the diagnostic agent process to the diagnostic server;
logic to receive data to provide one or more diagnostic procedures for the diagnostic agent process from the diagnostic server via the wireless network, wherein the one or more diagnostic procedures are selected by the diagnostic server based on the transmitted hardware version;
logic to upon receipt of the one or more diagnostic procedures, automatically execute the one or more diagnostic procedures using a firmware interface to provide one or more diagnostic results; and
logic to transmit the one or more diagnostic results to the diagnostic server.

12. The system of claim 11, wherein the processing system further comprises: logic to format the diagnostic results for transmission; and logic to transmit the formatted diagnostic results to the destination through the wireless network.

13. The system of claim 12, wherein the processing system further comprises logic to format the diagnostic results according to an extensible markup language.

14. The system of claim 11, wherein the processing system further comprises logic to transmit a message to the diagnostic server through the wireless network in response to a launch of the diagnostic agent process, the message requesting the data to provide the one or more diagnostic procedures.

15. The system of claim 11, wherein the processing system further comprises logic to transmit a request for the data to provide the one or more diagnostic procedures to the diagnostic server through the wireless network in response to a launch of the diagnostic agent process.

16. The method of claim 1, wherein the diagnostic agent process is launched natively at firmware included in the host processing system.

17. The article of claim 6, wherein the diagnostic agent process is launched natively at firmware included in the host processing system.

18. The system of claim 11, wherein the diagnostic agent process is launched natively at firmware included in the host processing system.

* * * * *

UNITED STATES PATENT AND TRADEMARK OFFICE
CERTIFICATE OF CORRECTION

| | | |
|---|---|---|
| PATENT NO. | : 7,225,245 B2 | Page 1 of 1 |
| APPLICATION NO. | : 09/927224 | |
| DATED | : May 29, 2007 | |
| INVENTOR(S) | : Gurumoorthy et al. | |

It is certified that error appears in the above-identified patent and that said Letters Patent is hereby corrected as shown below:

In column 10, at line 55, delete "serve" and insert --server--.

Signed and Sealed this

Twenty-ninth Day of April, 2008

JON W. DUDAS
*Director of the United States Patent and Trademark Office*